United States Patent
Gamberini

(10) Patent No.: US 6,510,939 B2
(45) Date of Patent: Jan. 28, 2003

(54) DEVICE FOR ACCELERATED CONVEYING OF A PACKAGE INTRODUCED BETWEEN TWO VERTICAL BELTS

(76) Inventor: Gianluigi Gamberini, Via Carrati 12, Bologna (IT)

(*) Notice: Subject to any disclaimer, the term of this patent is extended or adjusted under 35 U.S.C. 154(b) by 0 days.

(21) Appl. No.: 09/989,238

(22) Filed: Nov. 20, 2001

(65) Prior Publication Data

US 2002/0060131 A1 May 23, 2002

(30) Foreign Application Priority Data

Nov. 23, 2000 (IT) ........................................ BO23A0686

(51) Int. Cl.[7] .............................................. B65G 47/31
(52) U.S. Cl. .................................. 198/461.3; 198/461.2
(58) Field of Search ........................... 198/461.2, 459.1, 198/461.3, 721, 836.1

(56) References Cited

U.S. PATENT DOCUMENTS

| | | | | |
|---|---|---|---|---|
| 3,370,694 A | * | 2/1968 | Standley et al. ......... | 198/461.3 |
| 3,938,650 A | * | 2/1976 | Holt ..................... | 198/461.2 X |
| 4,230,218 A | * | 10/1980 | Kunzmann ............... | 198/461.3 |
| 4,815,581 A | * | 3/1989 | Deutschlander .......... | 198/461.3 |
| 5,762,175 A | * | 6/1998 | Folke et al. ......... | 198/461.3 X |

* cited by examiner

Primary Examiner—James R. Bidwell
(74) Attorney, Agent, or Firm—William J. Sapone; Coleman Sudol Sapone, P.C.

(57) ABSTRACT

A device for conveying packages includes a conveyor with a running surface ending with a terminal area, a series of stationary stops and vertical prongs under the stops and above the running surface. The prongs move along a path which follows a circular trajectory in the terminal area. Packages are introduced between two heat-sealing vertical belts in an inlet area. The inlet area of the vertical belts is situated at a distance from the terminal area of the conveyor. A forwarding belt, coplanar with the running surface of the conveyor, is situated between the inlet area and the terminal area of the conveyor. The forwarding belt is operated with a speed higher than the operation speed of the conveyor, so that the packages are not subjected to the prongs action when they rotate upward in the terminal area. The forwarding belt extends from the terminal area of the conveyor, to at least the inlet area of the vertical belts, and the stops protrude to cover the major part of the forwarding belt.

8 Claims, 1 Drawing Sheet

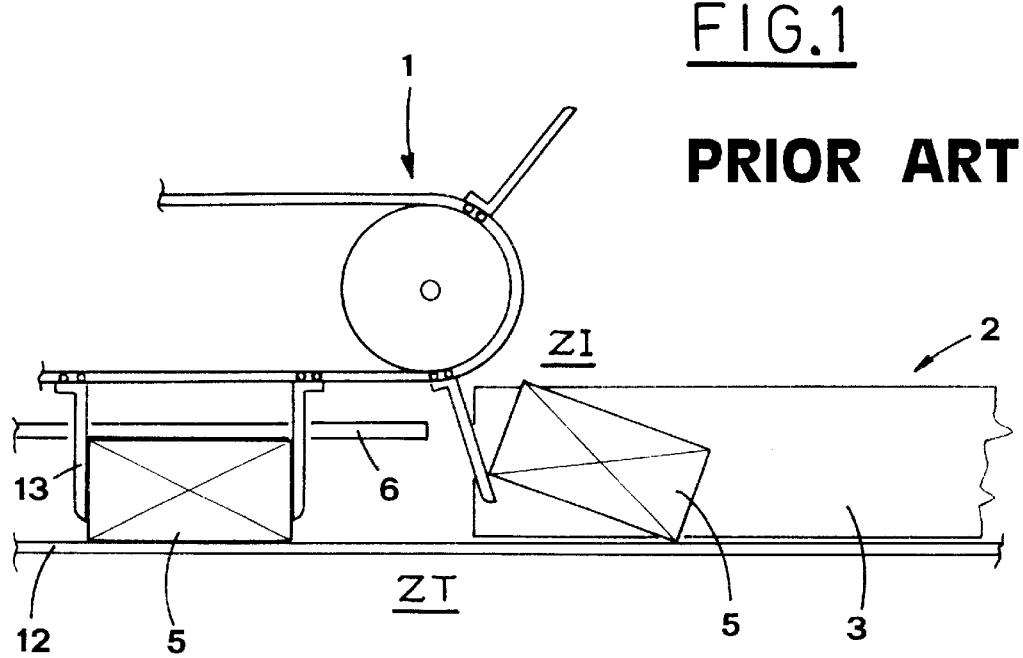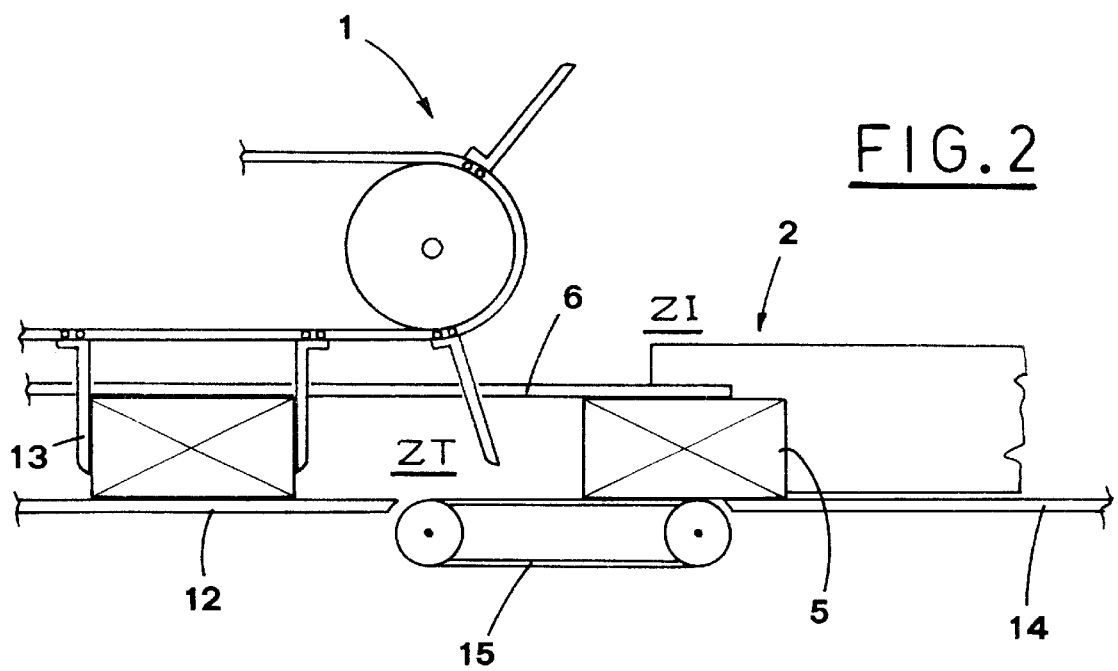

DEVICE FOR ACCELERATED CONVEYING OF A PACKAGE INTRODUCED BETWEEN TWO VERTICAL BELTS

FIELD OF THE INVENTION

The present invention relates to automatic packaging machines, in particular for wrapping articles with heat-sealing material.

DESCRIPTION OF THE PRIOR ART

Different types of articles are packaged with flexible synthetic material, which can be heat-welded.

From now on, reference will be made to packaging of paper rolls, e.g. tissue paper towels, which are wrapped within a sheet of heat-sealing material, e.g. polythene.

The rolls are moved, e.g. in pairs, toward a packaging station and during the run, they strike against the sheet of polythene and pull it with them, thus wrapping themselves with it.

Additional means fold the edges of the sheet under the rolls, which are kept in position by prongs of a conveyor situated and working over the packaging station.

The packaged articles are moved by the pronged conveyor, and during the movement on a running surface adjacent to the packaging station, the wrapping is heat-sealed along the overlapped edges.

The heads of the package, from which ring-like edges protrude, are still open and they are closed by heat-sealing in a subsequent station of the machine.

FIG. 1 shows the station of the machine, in which the heads of the packages are closed, with particular attention to the passage section from the pronged conveyor, indicated with 1, to a conveyor 2 with vertical sealing belts 3, situated downstream.

The packages 5 move forward on the running surface 12 of the prong conveyor 1. The packages 5 are kept between the pairs of adjacent prongs 13 and their upper part is stabilized by a series of motionless stops 6, including e.g. one or more bars, extending longitudinally with respect to the conveyor.

Actually, each of the prongs 13 as shown includes two or more prongs, which are aligned crosswise to the conveyor.

After having reached the terminal area ZT of the prong conveyor 1, the packages 5 are picked up from the vertical belts 3 of the belt conveyor 2 in the inlet area ZI thereof.

In the terminal area ZT, the prong conveyor 1 follows a circular trajectory, inverting the movement direction, so as to close in an endless loop in the upper run of its extension. As shown in FIG. 1, the free ends of the prongs 13, which pull the packages 5, tend to push the latter and to raise them in the area where the conveyor rotates, due to the acceleration imposed to the packages by the circular trajectory.

This movement of the package tends to set the wrapping into disorder and, in any case, it is undesirable for the package, whose appearance is no longer the best.

In order to avoid this problem, the vertical sealing belts 3 are usually operated to move much faster than the prong conveyor 1, so that the packages 5 are accelerated in the terminal area ZT and is no longer subjected to the action of the prongs 13 when the latter begins to curve upwards.

The sealing belts 3 are made of a material which can be heated and then, after having heated the overlapped edges of the packages 5 heads, it softens the heated edges and makes them adhere to each other, thus closing definitely the package. However, this kind of material does not react well to the stresses which the belts are subjected to in the curved areas of the return points.

The consequent damages are even bigger because of higher speed, with which the sealing belts are operated. This results in the necessity of frequent substitutions of the sealing belts, which increases considerably the costs.

Moreover, the higher speed of the sealing belts causes higher sealing temperature, since the sealing time is reduced. This provokes a bigger waste of energy.

SUMMARY OF THE INVENTION

The object of the present invention is to change the constructive characteristics of the device, so as to avoid the problem of stress, to which the packages are subjected due to the circular trajectory of the prongs, without operating the sealing belts with a speed higher than the minimum speed required by the packaging line operation, thus prolonging considerably the duration of the sealing belts.

Another object of the present invention is to obtain what above by a simple, functional and cheap solution, which does not affect remarkably the total cost of the equipment, nor of its subsequent maintenance.

The above mentioned objects are obtained, in accordance with the contents of the claims, by means of a device for accelerated conveying of packages in between two vertical belts at an inlet area, said package being brought by a conveyor including:

a running surface for the packages;

a terminal area of said running surface situated at a distance from said inlet area of said vertical belts;

series of stationary stops disposed above the running surface to constrain said packages;

a plurality of vertical prongs extending underneath said stops and above said running surface for moving the packages, said vertical prongs moving along a path which follows a circular trajectory at the terminal area;

said device including a forwarding belt, coplanar with said running surface of said conveyor, situated between said inlet area of said vertical belts and said terminal area of said conveyor, said forwarding belt being operated with a speed higher than the operation speed of said conveyor.

BRIEF DESCRIPTION OF THE DRAWINGS

The characteristic features of the present invention will be pointed out in the following description of a preferred, but not only embodiment, with reference to the enclosed drawings, in which:

FIG. 1 shows the area of the device related to the present invention, in its known configuration;

FIG. 2 shows the same area as FIG. 1 after having applied the proposed constructive configuration.

BEST MODES OF CARRYING OUT THE INVENTION

With reference to FIG. 2, reference numeral 1 indicates the conveyor with vertical prongs 13, substantially like in its traditional form.

The packages 5 are moved by the prongs 13 forward on the running surface 12, with the wrapping already sealed along the overlapped edges and with the heads still open.

The prong conveyor 1 moves along a path, which follows a circular trajectory upwards in the terminal area ZT, and then closes in a loop along the area situated over the conveyor. The upper part of the packages 5 is held also by a series of stops 6, which include two or more parallel bars.

Each package is to be introduced between the two vertical sealing belts 3, in the inlet area ZI of the sealing belts 3 and over a sliding plane 14. The sealing belts 3 form a downstream conveyor 2.

Although the sliding plane 14 is an important element of the device taken as a whole, it could be even eliminated, if the two vertical sealing belts 3 were capable of maintaining the correct position of the packages 5.

According to the invention, the inlet area ZI of the vertical belts 3 is situated at a certain distance from the terminal area ZT of the prong conveyor 1.

A forwarding belt 15, made of e.g. silk, coplanar with the running surface 12, is situated in the free area, created between the inlet area ZI of the vertical belts 3 and the terminal area ZT of the prong conveyor 1.

The forwarding belt 15 is operated with higher speed with respect to the operation speed of the prong conveyor 1, so that the package 5 is not subjected to the action of the prongs 13, which is rotating upwards when the package is released onto the forwarding belt 15 by the prongs situated downstream.

The forwarding belt 15 extends from the terminal area ZT of the prong conveyor 1 up to the inlet area ZI of the vertical belts 3, while the stops 6 protrude up to extend along the major part of the forwarding belt 15.

In FIG. 2, the stops cover the whole extension of the forwarding belt 15, but their length can be advantageously different, e.g. smaller, as long as the packages 5 maintain a sufficiently stable position in the area ZI.

The vertical belts 3 of the conveyor 2 are operated with the speed corresponding to the speed necessary to match the packaging line production rate, and not higher, as the acceleration of the packages is imposed by the forwarding belt 15 in order to avoid the rotating prongs action.

After having been taken in between the vertical sealing belts 3, which perform a predetermined pressure, so as to make the action of the forwarding belt inefficient, the package 5 moves again with its normal speed, while the forwarding belt 15 rubs slidingly on the bottom thereof.

Then, the heads of the package are sealed.

As it appears evident from the present description, the vertical sealing belts 3 can be operated with normal speed, not higher than the speed of the packaging line, since the acceleration of the packages is imposed by the forwarding belt 15.

Moreover, the sealing temperature can be lowered, because the packages remain in touch with sealing belts for longer periods of time.

Thus, some more energy is saved and the sealing belts necessitate less frequent substitution, which results in another big saving.

The forwarding belt 15 can be made of a material different than silk, as long as its friction does not damage the wrapping of the packages 5.

In the example mentioned in the introduction, the described constructive configuration has been applied to a machine for packaging articles in rolls, e.g. kitchen towels.

However, it is understood that the present invention can be used for machines and pieces of equipment operating in a similar way, aimed at packaging also other kinds of articles.

It is understood that what above, has been described as a pure, not limitative example, therefore, possible variants of the invention remain within the protective scope of the present technical solution, as described above and claimed hereinafter.

What is claimed is:

1. A device for accelerated conveying of packages in between two vertical belts at an inlet area, said package being brought by a conveyor including:

a running surface for the packages;

a terminal area of said running surface situated at a distance from said inlet area of said vertical belts;

series of stationary stops disposed above the running surface to constrain said packages;

a plurality of vertical prongs extending underneath said stops and above said running surface for moving the packages, said vertical prongs moving along a path which follows a circular trajectory at the terminal area;

said device including a forwarding belt, coplanar with said running surface of said conveyor, situated between said inlet area of said vertical belts and said terminal area of said conveyor, said forwarding belt being operated with a speed higher than the operation speed of said conveyor.

2. A device as in claim 1, wherein said forwarding belt extends from said terminal area of said conveyor to at least said inlet area of said vertical belts.

3. A device as in claim 1, wherein said stationary stops extend above the major part of said forwarding belt.

4. A device as in claim 1, wherein said stops extend above the whole extension of said forwarding belt.

5. A device as in claim 1, wherein a sliding surface is situated between said vertical belts.

6. A device as in claim 1, wherein said vertical belts are heat-sealing belts, aimed at heat-sealing open heads of said packages.

7. A device as in claim 1, wherein said forwarding belt includes a belt made of silk.

8. A device as in claim 1, wherein said forwarding belt includes a belt made of a material causing a friction smaller than the friction of the vertical belts.

* * * * *